United States Patent

Schalk

[11] Patent Number: 5,845,246
[45] Date of Patent: Dec. 1, 1998

[54] METHOD FOR REDUCING DATABASE REQUIREMENTS FOR SPEECH RECOGNITION SYSTEMS

[75] Inventor: Thomas B. Schalk, Dallas, Tex.

[73] Assignee: Voice Control Systems, Inc., Dallas, Tex.

[21] Appl. No.: 396,018

[22] Filed: Feb. 28, 1995

[51] Int. Cl.$^6$ .................................................. G10L 5/06
[52] U.S. Cl. ........................ 704/243; 704/244; 704/251
[58] Field of Search ........................... 381/42, 43; 395/2, 395/2.42, 2.52, 2.6; 704/233, 243, 244, 251

[56] References Cited

U.S. PATENT DOCUMENTS

| | | | |
|---|---|---|---|
| 4,783,802 | 11/1988 | Yakebayashi et al. | 704/243 |
| 5,054,085 | 10/1991 | Meisel et al. | 704/251 |
| 5,384,892 | 1/1995 | Strong | 704/243 |
| 5,475,792 | 12/1995 | Stanford et al. | 704/233 |
| 5,513,298 | 4/1996 | Stanford et al. | 704/243 |

*Primary Examiner*—David R. Hudspeth
*Assistant Examiner*—Tálivaldis Ivars Šmits
*Attorney, Agent, or Firm*—David H. Judson

[57] ABSTRACT

The present invention comprises a method for reducing the database requirements necessary for use in speaker independent recognition systems. The method involves digital processing of a plurality of recorded utterances from a first database of digitally recorded spoken utterances. The previously recorded utterances are digitally processed to create a second database of modified utterances and then the first and second databases are combined to form an expanded database from which recognition vocabulary tables may be generated.

12 Claims, 2 Drawing Sheets

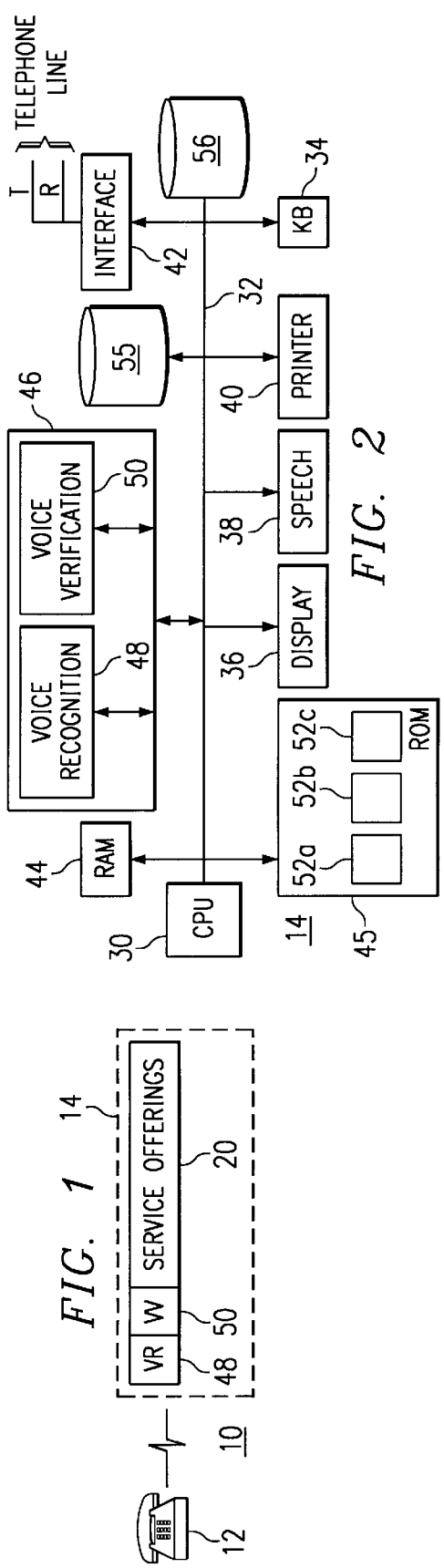
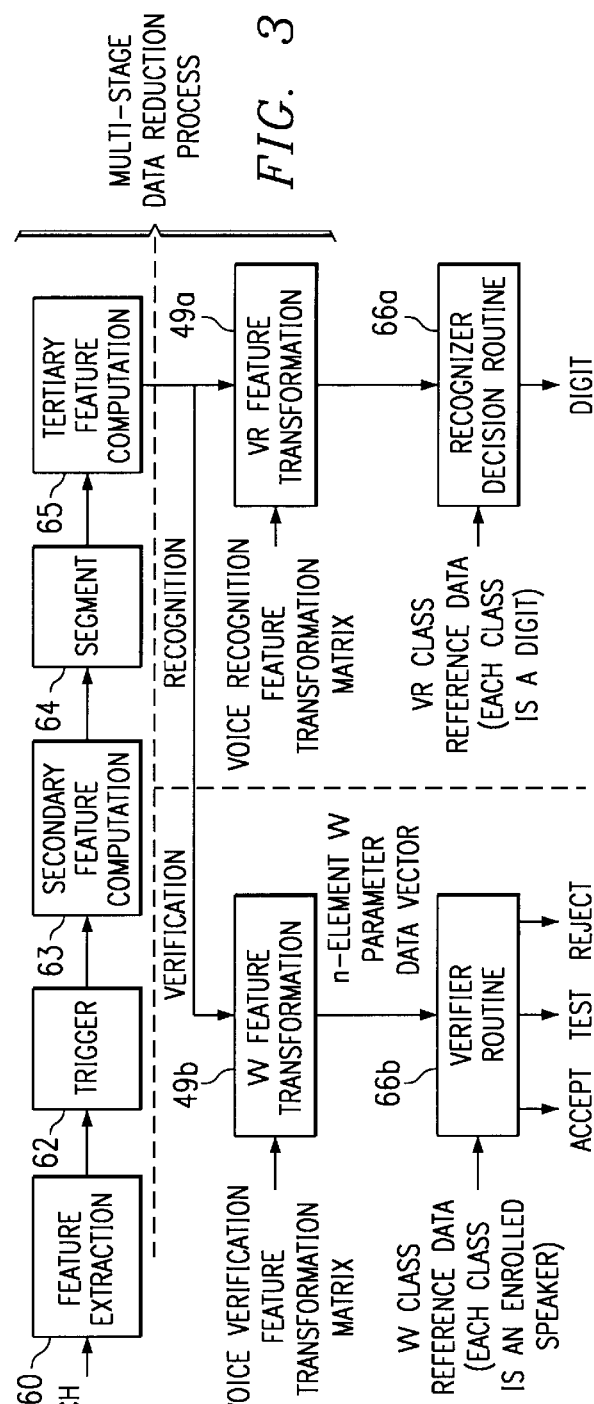

METHOD FOR REDUCING DATABASE REQUIREMENTS FOR SPEECH RECOGNITION SYSTEMS

TECHNICAL FIELD

The present invention relates to speech recognition systems, and more particularly, to a method for reducing the database requirements necessary for training speaker independent recognition systems.

BACKGROUND OF THE INVENTION

The public telephone network is a challenging environment for automatic speech recognizers. Microphone variation, wiring conditions, signal bandlimiting, and gain variation are some of the factors that can adversely affect speech recognition performance. The output signal is then superimposed with background noise, and transmitted over the telephone network wherein transmission noise is further added to the signal. The transmission noise may consist of high frequency tones, 60 Hz tones, EMI cross-talk, white noise, and transmission echos, cracks, and pops. The speech input signal is also bandlimited from approximately 300 Hz to 3.3 KHz which makes the speech less intelligible. In addition, variable equalizers are sometimes used to help line conditions meet required specifications. Finally, from the speech recognizers perspective, an overall gain factor can span a range of 30 dB.

To accommodate such a wide range of degrading effects for recognition systems, large speech databases are required for system vocabulary development and testing. In order to develop a speaker independent recognition vocabulary, the vocabulary requirements of the recognizer must first be determined and then a large group of data representing the required vocabulary must be collected. For the purposes of training a speaker independent recognizer, most researchers believe that approximately 1,000 callers will adequately represent the telephone network and speaker variations for a typical vocabulary including digits, letters and a few control words. The calls should be made from a wide range of geographical locations and the database test group must be balanced with regards to sex, dialect, and local versus long distance phone calls. The collected data is used to create a vocabulary which must then be tested to determine the accuracy of the recognition vocabulary.

It is generally believed that the larger and more representative the database, the better accuracy the system provides. Since a great deal of time and effort is involved in collecting a database, it is extremely important to minimize the effort involved in collecting the data to create cheaper, more easily created recognition systems. However, a shortage of data for generating the recognition vocabulary results in degraded accuracy, particularly under the conditions that are not adequately represented by the database. A method for reducing these database requirements for a recognition vocabulary while maintaining recognition accuracy would greatly enhance the ability of individuals to create speaker independent recognizers and limit the cost involved in creating such a recognizer.

SUMMARY OF THE INVENTION

The present invention overcomes the foregoing and other problems with a method for reducing the database requirements for a speaker independent recognition system. Initially a user must select a number of utterances (digits, letters, words) comprising a vocabulary to be utilized by the speaker independent recognizer. These selected utterances are then digitally recorded using a group of sample users to create a first database of spoken utterances. Each of the digitally recorded utterances are then processed by a variety of data processing techniques to create a plurality of modified versions of the originally recorded utterances. These modified utterances are stored in a second database.

The data processing techniques involved in generating this second database include, but are not limited to, random logarithmic scaling; data filtering to emphasize and de-emphasize low and high frequency information; temporal compression and expansion; addition of digital noise and mixing words from preexisting speech databases to the recorded utterances. The first and second databases are combined into an expanded database having the operational characteristics of a database formed from a much larger group of sample users than was used to create the first database. This expanded database is used in generating vocabulary reference tables for speaker independent recognition systems.

The foregoing has outlined some of the more pertinent aspects of the present invention. These aspects should be construed to merely be illustrative of some of the more prominent features and applications of the invention. Many other beneficial results can be attained by applying the disclosed invention in a different manner of modifying the invention as will be described. Accordingly, other aspects and a fuller understanding of the invention may be had by referring to the following detailed description of the preferred embodiment.

DESCRIPTION OF THE DRAWINGS

For a more complete understanding of the present invention and the advantages thereof, reference should be made to the following detailed description taken in connection with the accompanying drawings in which:

FIG. 1 is a schematic drawing of telephone network having a calling station connectable to a digital processing system of a service provider;

FIG. 2 is a schematic diagram of the digital processing system of FIG. 1 for use in providing speaker independent voice recognition and verification according to the teachings of the present invention;

FIG. 3 is a block diagram of the preferred voice recognition/verification algorithms of this invention;

Similar reference characters refer to similar parts and/or steps throughout the several views of the drawings.

DETAILED DESCRIPTION

Figure 4:
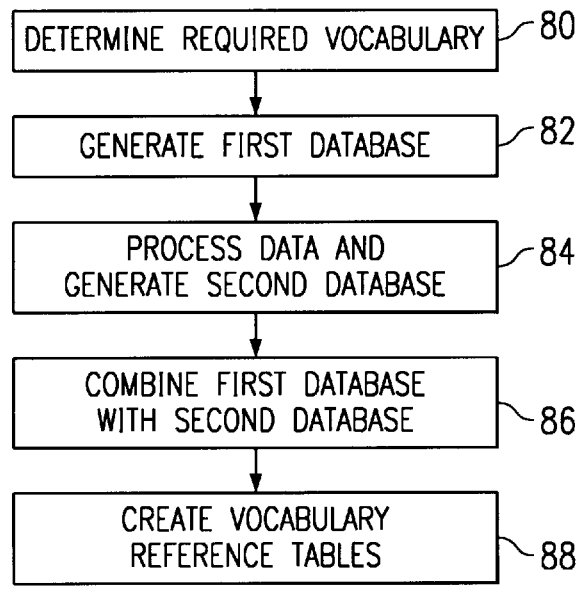
FIG. 4 is a flow chart illustrating a method for generating a training database for a speaker independent recognizer.

FIG. 1 illustrates a block diagram of a conventional telephone network 10 having a calling station 12 connectable to a digital processing system 14 of a financial institution. According to the teachings of the present invention, the digital processing system 14 includes a speaker-independent voice recognition algorithm 48 and an associated voice verification algorithm 50 to facilitate voice-controlled access to one or more services 20 offered by the financial institution. These services include, but are not limited to, account balance inquiry and electronic funds transfer. Moreover, while the following discussion describes the use of voice recognition/verification in the context of accessing information stored in a financial institution, it should be appreciated that the teachings of the invention are not so limited. The invention can be used for numerous other applications such as credit card validation, order-entry of goods/services and personal identification validation. Further, it should also be appreciated that the telephone network may include other devices and switching systems conventional in the art. Accordingly, calling station 12 may be connected through a central office or other switching device, such as an access tandem or interexchange carrier switching system, before connection to the service provider.

Referring now to FIG. 2, a block diagram is shown of the digital processing system 14 of the present invention for providing simultaneous speaker-independent voice recognition and verification. The system includes a central processing unit (CPU) 30 for controlling the overall operation of the system. The CPU includes data, address and control buses represented generally by the reference numeral 32. As seen in FIG. 2, the system 14 also includes conventional input/output devices such as a keyboard 34, display terminal 36, speech generator 38 and printer 40. A communications interface 42 (which may be microprocessor-controlled) interfaces the system to the telephone line. Random access memory ("RAM") 44 is connected to the CPU by bus 32 for providing temporary storage of data processed thereby. Read only memory ("ROM") 45 is likewise connected to the digital processor for providing permanent storage of special recognition and verification data as will be described below. Disk storage 46 supports control programs including a voice recognition algorithm 48 and a voice verification algorithm 50 as well as suitable control programs (not shown).

According to the invention, ROM 45 stores voice recognition reference information for use by the voice recognition algorithm 48. This information is of two (2) types: voice recognition feature transformation data 52a and voice recognition class reference data 52b derived from a first plurality of training speakers over a telephone network. In particular, voice recognition feature transformation data 52a and voice recognition class reference data 52b is derived, in a prior off-line process, from a voice recognition training database 53 including "digit", "letter" or other voice command data from a large number of training speakers (e.g., 1000) collected over the telephone network. This training database 53 includes local and long distance data, and significant amounts of data collected through carbon button handset microphones and electret handset microphones. The voice recognition class reference data 52b includes a representation for each digit word (e.g., "one," "two," etc.), letter word (e.g., "a", "b", etc.) or voice command as a "class" sought to be recognized by the voice recognition algorithm 48. For example, the representation of the class for the digit "one" is derived from the data from all of the training speakers who spoke the digit "one."

The voice recognition training database 53 is thus designed to represent the distribution of acoustic characteristics of each digit word, letter word or voice command across a large population of speakers. The purpose and effect of the analysis performed on this database is to optimize the parameters of a multiple stage data reduction process so as to discover and accurately represent those characteristics of each digit word that differentiate it from each other digit word, regardless of speaker.

According to another feature of the invention, ROM 45 also supports voice verification feature transformation data 52c. This data is derived, in a prior off-line process, from a voice verification training database (not shown). In particular, the voice verification training database preferably includes data generated from approximately 100–150 training speakers and is collected over the telephone network. The database includes local and long distance data, and significant amounts of data are collected through carbon button handset microphones and electret handset microphones. Each training speaker is provided with a script containing random digit sequences. The sequences are spoken in a predetermined number (e.g., 5) of separate recording sessions, with the first recording session containing a predetermined number (e.g., 5) of passes of the digits spoken in random order. The subsequent sessions each contain a predetermined number (e.g., 3) of passes of the digits spoken in random order, and each recording session is separated from the previous session by at least one day.

The voice verification training database is thus designed to represent the distribution of acoustic characteristics of each digit word spoken by a particular training speaker across multiple utterances of the digit word by that speaker. The purpose and effect of the analysis performed on this database is to optimize the parameters of a multiple stage data reduction process so as to discover and accurately represent those characteristics of each digit word uttered by each particular training speaker that differentiate it from the same digit word uttered by each other training speaker.

The voice verification technique requires the authorized users of the system (i.e., those persons expected to call over the telephone system to access information) to have previously enrolled in the system. Accordingly, the system 14 also includes a voice verification reference database 55 comprising voice verification class reference data collected from users authorized to access the services. Enrollment is preferably accomplished by having the user speak a ten-digit password five times. For further security, the caller is asked to answer a few factual personal questions that can be answered using digits recognizable by the voice recognition algorithm 48. These questions may include, but need not be limited to, the user's social security number, account number or birth date. Each "class" of the voice verification class reference data represents an authorized user of the system. The class reference data for all authorized users of the system is then stored in the voice verification reference database 55.

The system 14 also includes a transaction database 56 for storing financial and transaction data, such as account balances, credit information and the like. This information is preferably stored at predetermined locations addressed by the caller's password. Thus the password identifies both the caller and the location of the data sought to be accessed.

In operation of the preferred method, assume a caller places a call from the calling station 12 to the financial institution in order to access account information. The caller has previously enrolled in the voice verification reference database 55. Once the call setup has been established, the speech generator 38 of the digital processing system 14 prompts the caller to begin digit-by-digit entry of the caller's predetermined password starting with the first digit and ending with the last digit thereof. Prompting of the digits, alternatively, can be effected in any desired manner or sequence. Signals are interfaced to the telephone line by the communications interface 42. As each digit is spoken, the voice recognition algorithm 48 processes the received information and, as will be described below, uses a statistical recognition decision strategy to determine the digit (zero through nine and "oh").

After all digits have been recognized, a test is made to determine whether the entered password is valid for the system. If the outcome of the test if positive, the caller is conditionally accepted because the system "knows" who the caller claims to be and thus where the account information is stored. Thereafter, the system uses the voice verification algorithm 50 to perform voice verification on the caller to determine if the entered password has been spoken by a voice previously enrolled in the database 55 and assigned to the entered password. If the verification algorithm 50 establishes a "match" within predetermined acceptance criteria, access to the data or other system service is allowed. If the algorithm 50 cannot substantially match the entered voice to a voice stored in the database 55, the system rejects the access inquiry and the call is terminated. If the algorithm 50 substantially matches the entered voice to a voice stored in the database 55, but not within a predetermined acceptance criterion, the system prompts the caller to input additional personal information (e.g., the caller's social security number or account number) associated with the password to further test the identity of the claimed owner of the password. If the caller cannot provide such information, the system rejects the access inquiry and the call is terminated. Correct entry of the requested information enables the caller to gain access to the service.

Referring now to FIG. 3, a block diagram is shown of a preferred embodiment of the voice recognition and verification algorithms 48 and 50. As will be seen, algorithms 48 and 50 share the functional blocks set forth in the upper portion of the block diagram. These blocks comprise a speech processing means for carrying out a first tier of a multistage data reduction process. In particular, as speech is input to the system 14, a feature extractor 60 extracts a set of primary features that are computed in real time every 10 milliseconds. The primary features include heuristically-developed time domain features (e.g., zero crossing rates) and frequency domain information such as Fast Fourier Transform ("FFT") coefficients. The output of the feature extractor 60 is a reduced data set (approximately 4,000 data points/utterance instead of the original approximately 8,000 data points/utterance) and is applied to a trigger routine 62 that captures spoken words using the primary features. The trigger routine is connected to a secondary feature routine 63 for computing "secondary features" from the primary features. The secondary features preferably result from non-linear transformations of the primary features. The output of the routine 63 is connected to phonetic segmentation routine 64. After an utterance is captured and the secondary features are computed the routine 64 provides automatic phonetic segmentation. To achieve segmentation, the phonetic segmentation routine 64 preferably locates voicing boundaries by determining an optimum state sequence of a two-state Markov process based on a sequence of scalar discriminant function values. The discriminant function values are generated by a two-class Fisher linear transformation of secondary feature vectors. The voicing boundaries are then used as anchor points for subsequent phonetic segmentation.

After the phonetic boundaries are located by the phonetic segmentation routine, the individual phonetic units of the utterance are analyzed and so-called "tertiary features" are computed by a tertiary feature calculation routine 65. These tertiary features preferably comprise information (e.g., means or variances) derived from the secondary features within the phonetic boundaries. The tertiary features are used by both the voice recognition algorithm 48 and the voice verification algorithm 50 as will be described. The output of the routine 65 is a tertiary feature vector of approximately 300 data points/utterance. As can be seen then, the upper portion of FIG. 3 represents the first tier of the multistage data reduction process which significantly reduces the amount of data to be analyzed but still preserves the necessary class separability, whether digit-relative or speaker-relative, necessary to achieve recognition or verification, respectively. The middle portion of FIG. 3 represents a second tier of the data reduction process and, as will be described, comprises the transformation routines 49*a* and 49*b*.

To effect speaker-independent voice recognition, the tertiary features are first supplied to the voice recognition linear transformation routine 49*a*. This routine multiplies the tertiary feature vector by the voice recognition feature transformation data (which is a matrix) 52*a* to generate a voice recognition parameter data vector for each digit. The output of the transformation routine 49*a* is then applied to a voice recognition statistical decision routine 66*a* for comparison with the voice recognition class reference data 52*b*. The output of the decision routine 66*a* is a yes/no decision identifying whether the digit is recognized and, if so, which digit is spoken.

Specifically, decision routine 66*a* evaluates a measure of word similarity for each word in the vocabulary. The voice recognition class reference data 52*b* includes various elements (e.g., acceptance thresholds for each digit letter or word class, inverse covariances and mean vectors for each class) used by the decision strategy. For a digit, letter or word to be declared (as opposed to being rejected), certain acceptance criteria must be met. The acceptance criteria may include, but need not be limited to, the following. The voice recognition algorithm determines the closest match between the class reference data and the voice recognition parameter vector for the digit; this closest match is a so-called "first choice." The next closest match is a "second choice." Each choice has its own matching score. The digit, letter or word is declared if (1) the matching score of the first choice is below a predetermined threshold, and (2) the difference between the matching score(s) of the first choice and the second choice digits is greater than another predetermined threshold. When all digits of the password have been recognized, the voice recognition portion of the method is complete.

To effect voice verification, the tertiary features are also supplied to a linear transformation routine 49*b* that multiplies each tertiary feature vector by the voice verification feature transformation data (which is a matrix). The output of the routine 49*b* is an $N_p$-element vector p of voice verification parameter data for each digit of the password, with $N_p$ preferably approximately equal to 25. The voice verification parameter data vector p is then input to a verifier routine 66*b* which also receives the voice verification class reference data 52*c* for the caller. Specifically, the voice verification class reference data is provided from the voice verification reference database 55. As noted above, the address in the database 55 of the caller's voice verification class reference data is defined by the caller's password derived by the voice recognition algorithm 48.

Verifier routine 66*b* generates one of three different outputs: ACCEPT, REJECT and TEST. An ACCEPT output authorizes the caller to access data from the transaction database 56. The REJECT output is provided if the verifier disputes the purported identity of the caller. The TEST output initiates the prompting step wherein additional follow-up questions are asked to verify the caller's identity.

Referring now to FIG. 4, a flow chart is shown illustrating the method for generating the training database 53 utilized in generating the voice recognition feature transformation data 52a and voice recognition class reference data 52b. Initially, the required vocabulary for a particular database is selected at Step 80. This vocabulary may include any number of voice commands, digits or letters used by a speaker independent recognition system. The voice recognition data is collected at Step 82 into a first database. This first database comprises a collection of digitally recorded speech utterances of the determined vocabulary words. The utterances are recorded from a number of users at differing times and under differing environmental conditions. The calls from which the first database is created preferably are made from a wide range of geographic locations and the callers balanced with respect to sex and dialect. Alternatively, the utterances initially may be recorded in analog form and later digitally stored to facilitate subsequent processing techniques. Presently existing systems require the use of at least 1,000 individuals to generate a training database having desired operating characteristics. A smaller database created from a lesser number of individuals results in degraded accuracy of the speaker independent recognizer.

In order to provide a training database having adequate operating characteristics using a smaller initial database, a second database is created at step 84 by processing the digitally stored data in the first database to modify the existing data representing the utterances to create a second database having modified utterances with different, but predictable acoustic properties. The particular types of processing techniques involved will be more fully discussed with respect to FIG. 5. The data processing techniques utilized at step 84 are designed to take the original digitally recorded utterances and change the perceived sound associated with the original recorded utterances to form a modified utterance different from the original. This technique enables the creation of a plurality of modified utterances representative of alternative conditions within the telephone network without having to record the utterance from another sample user. The modified utterances are then stored in a second database. The first database and second database are combined at step 86 to create an expanded database providing training qualities normally achieved from a database having a larger number of sample individuals. The expanded database is utilized to create at step 88 the vocabulary reference tables used by the speaker independent recognizer.

Figure 5:
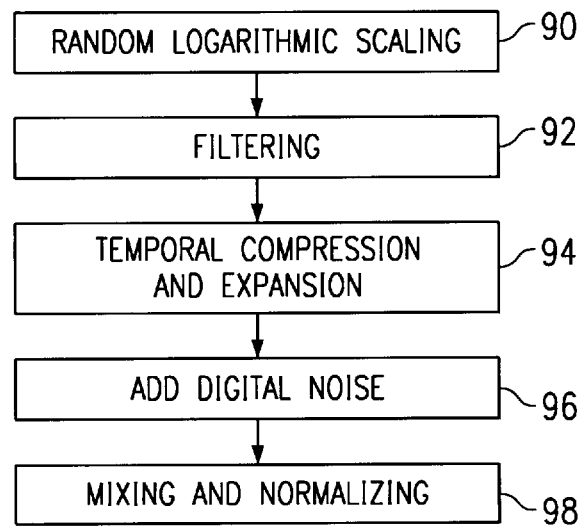
FIG. 5 is a flow chart illustrating a number of data processing techniques for creating a second database as described in FIG. 4.

Referring now to FIG. 5, there is illustrated a flow diagram of a number of the data processing techniques that are used to generate the second database described previously with respect to FIG. 4. It should be understood, that this set of data processing techniques is not exclusive, and additional techniques may be utilized to further reduce the database requirements for a speaker independent recognizer. One of the data processing techniques discussed at step 90 involves the random logarithmic scaling of the digital samples of each recorded utterance. At step 92, the digital samples comprising each recorded utterance are filtered to first emphasize the low and high frequency information contained within each digital sample and are then filtered to de-emphasize the low and high frequency information with any digital sample. The digital samples comprising the recorded utterances are next subjected at step 94 to temporal compression and expansion to both increase and decrease the perceived pitch of the utterances and to alter the format of the frequencies within the utterances. Digital noise may also be added to the digital samples comprising each recorded utterance at step 96. The digital noise contains various environmental spectral characteristics. Finally, the digital samples comprising the utterance may be mixed at step 98 with words from other preexisting speech databases and the average audio levels of the mixed words normalized. Each of the above discussed data processing techniques are performed on a previously recorded utterance in the first database and the modified utterance stored in the second database before a new unmodified version of an utterance is modified by the next processing technique. However, to create an even larger second database, multiprocessing techniques may be used on a previously recorded utterance from the first database.

It should be appreciated by those skilled in the art that the specific embodiments disclosed above may be readily utilized as a basis for modifying or designing other structures for carrying out the purposes of the present invention. It should also be realized by those skilled in the art that such equivalent constructions do not depart from the spirit and scope of the invention as set forth in the appended claims. The claims and detailed description will follow.

What is claimed is:

1. A method for reducing database requirements for a speaker independent recognizer of a speech recognition system, comprising the steps of:

selecting a plurality of utterances from a set of preexisting speech databases comprising the vocabulary of the speech recognition system;

recording into a first database samples of the selected utterances from a predetermined number of sample users;

processing each of the samples of the first database to create a plurality of modified samples of the selected utterances, the modified samples forming a second database, wherein the step of processing includes a step of filtering the samples to emphasize and de-emphasize high and low frequency information within the samples; and combining the first database and the second database to generate an expanded database for use in training the speaker independent recognizer.

2. The method of claim 1 wherein the step of processing includes a step of applying random logarithmic scaling to the samples.

3. The method of claim 1 wherein the step of processing further includes a step of applying temporal compression and expansion to the samples to generate modified samples having altered pitch.

4. The method of claim 1 wherein the step of processing further includes a step of applying temporal compression and expansion to the samples to generate modified samples having altered format frequencies.

5. The method of claim 1 wherein the step of processing further includes a step of adding noise to each of the samples.

6. The method of claim 1 wherein the step of processing further includes a step of:

mixing samples from preexisting speech databases with samples of the first database; and normalizing average audio levels for the mixed samples.

7. A method for reducing training database sample requirements for speaker independent recognition systems, comprising the steps of:

creating a training database of a plurality of digital samples, each digital sample representing a spoken utterance recorded from a sample user;

digitally processing each of the plurality of digital samples to generate a plurality of modified digital samples wherein the step of digitally processing includes the step of filtering the digital samples to emphasize and de-emphasize high and low frequency information within the digital samples; and adding the plurality of modified digital samples to the training database to provide an expanded training database.

8. The method of claim 7 wherein the step of digitally processing includes a step of applying random logarithmic scaling to the digital samples.

9. The method of claim 7 wherein the step of digitally processing further includes a step of applying temporal compression and expansion to the digital samples to generate modified digital samples having an altered pitch.

10. The method of claim 7 wherein the step of digitally processing further includes a step of applying temporal compression and expansion to the digital samples to generate modified digital samples having altered format frequencies.

11. The method of claim 7 wherein the step of digitally processing further includes a step of adding digital noise to each of the digital samples to generate modified digital samples.

12. The method of claim 7 wherein the step of digitally processing further includes a step of:

mixing digital samples from a selected set of preexisting speech databases with digital samples of the first database; and normalizing average audio levels for the mixed digital samples.

\* \* \* \* \*